United States Patent [19]

Tanaka et al.

[11] 4,169,450

[45] Oct. 2, 1979

[54] INTERNAL COMBUSTION ENGINE FOR AN AUTOMOBILE PROVIDED WITH AN AIR-CONDITIONER

[75] Inventors: Masaru Tanaka; Kazuyoshi Tasaka; Tetuo Tanigawa, all of Toyota, Japan

[73] Assignee: Toyota Jidosha Kogyo Kabushiki Kaisha, Aichi, Japan

[21] Appl. No.: 779,054

[22] Filed: Mar. 18, 1977

[30] Foreign Application Priority Data

Dec. 22, 1976 [JP] Japan .............................. 51-170825[U]
Dec. 22, 1976 [JP] Japan .............................. 51-170826[U]

[51] Int. Cl.² ............................................. F02B 77/00
[52] U.S. Cl. ........................ 123/198 D; 123/DIG. 11
[58] Field of Search ...... 123/198 D, 198 R, DIG. 11, 123/98

[56] References Cited

U.S. PATENT DOCUMENTS

| | | | |
|---|---|---|---|
| 2,886,020 | 5/1959 | Wolfe | 123/198 D |
| 3,158,144 | 11/1964 | Walker | 123/DIG. 11 |
| 3,251,352 | 5/1966 | Walker | 123/198 R X |
| 3,485,059 | 12/1969 | Hawks | 123/198 R X |
| 3,545,561 | 12/1970 | Bradley | 123/98 X |
| 3,692,007 | 9/1972 | Nilssen | 123/198 R X |

Primary Examiner—Ira S. Lazarus
Attorney, Agent, or Firm—Stevens, Davis, Miller & Mosher

[57] ABSTRACT

An internal combustion engine for an automobile provided with an air conditioner which has an electromagnetic clutch capable of connecting the crankshaft of the engine with a compressor of the air conditioner. A switch mechanism is provided for engaging the clutch just after the ignition switch is opened to effectively brake the rotation of the crankshaft due to inertia by using a load of the compressor. Thus, the so-called "dieseling" can be prevented.

5 Claims, 6 Drawing Figures

INTERNAL COMBUSTION ENGINE FOR AN AUTOMOBILE PROVIDED WITH AN AIR-CONDITIONER

FIELD OF THE INVENTION

The present invention relates to an internal combustion engine for an automobile provided with an air conditioner, which is capable of preventing the so-called "dieseling".

BACKGROUND OF THE INVENTION

In a carburetor-type internal combustion engine, the so-called "dieseling" is a phenomenon wherein the engine continues to rotate after the ignition switch is opened due to the compression ignition of the fuel which is issued from the slow fuel supply passageway of the carburetor. In such an engine, "dieseling" is generated under a condition wherein the temperature of the intake air is relatively high.

The "dieseling" phenomonen is apt to be generated if the automobile is provided with an air conditioner, because such an engine has a so-called "idle-up device" which operates to increase the opening of the throttle valve when the throttle valve is in its idle position.

SUMMARY OF THE INVENTION

An object of the present invention is to provide a new system capable of preventing "dieseling" in the carburetor-type internal combustion engine of an automobile provided with an air conditioner.

Provided according to the present invention is an internal combustion engine for an automobile with an air conditioner, which air conditioner has a compressor and an electromagnetic clutch mechanism capable of mechanically connecting the crankshaft of the engine with the compressor when air conditioning is required during the operation of the engine in which the ignition switch of the engine is closed. The engine comprises means for engaging the clutch mechanism just after the ignition switch is opened to stop the engine, so that the rotation of the engine is effectively braked by the load of the compressor. Thus, the occurrence of the "dieseling" phenomenon can be prevented.

DESCRIPTION OF THE PREFERRED EMBODIMENTS

Figure 1A:
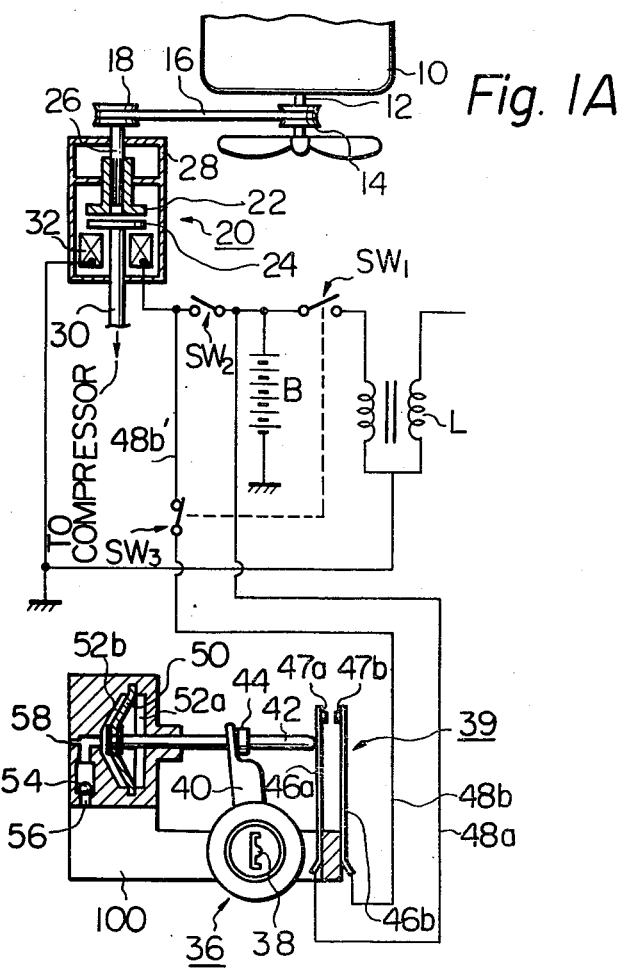
FIG. 1A is a schematic view showing a first embodiment of the present invention, in which a mechanical delay switch having a dashpot mechanism is in its OFF position.

In FIG. 1A showing a first embodiment of an internal combustion engine for an automobile according to the invention, in order to prevent the "dieseling" phenomenon, the air conditioner of the automobile is operated, by means of a mechanical delay switch, for a predetermined short period of time after the ignition switch of the engine is opened to stop the engine. In FIG. 1A, numeral 10 designates an engine body which has a crankshaft 12. The automobile has a clutch 20 of an electromagnetic type, which is capable of disengageably connecting the crankshaft 12 with a compressor (not shown) of the air conditioner of the automobile, as will be fully described later. The clutch 20 has a first friction disk 22 and a second friction disk 24, both facing each other. The first friction disk 22 has a spline hole adapted for axially slidably receiving an input shaft 26 which is rotatably mounted to a housing 28. The input shaft 26 has, on one end thereof, a pulley 18 which is connected to a pulley 14 mounted on the crankshaft 12 via a belt 16. The second friction disk 24 has an output shaft 30 which is rotatably supported by the housing 28. Connected to the output shaft 30 is a compressor (not shown) of the air conditioner. A tubular-shaped solenoid 32 is arranged in the housing 28 adjacent to the second friction disk 24. A battery B of the engine is connected to the solenoid 32 via an air conditioning control switch $SW_2$. When the switch $SW_2$ is closed and switched to its ON position, the solenoid 32 becomes energized. This causes the first friction disk 22 to be moved to become engaged with the second disk 24 due to the electromagnetic force generated between the two disks 22 and 24. Thus, the output shaft 30 connected to the compressor is rotated by the rotation of the crankshaft 12 of the engine, thereby operating the air conditioner (not shown).

Numeral 36 is a lock device mounted to a stationary support 100 and having an ignition key 38 which can be fitted to a key hole of the lock device 36. The lock device 36 is provided with a known mechanism (not shown) adapted for forming an ignition switch $SW_1$, as schematically illustrated in FIG. 1A, which ignition switch $SW_1$ is closed and switched to its ON position when the ignition key 38 is turned in a clockwise direction of FIG. 1A, thereby causing the battery B to be connected with the ignition coil L. Thus, the engine can begin to rotate.

According to the invention, the lock device 36 further has a mechanical delay switch device 39 adapted to to energize the solenoid 32 for a predetermined short period of time after the igniton switch $SW_1$ is opened to stop the engine. The mechanical delay switch 39, which is similar to those described in U.S. Pat. No. 3,158,144, has a lever 40 capable of being turned by the ignition key 38. A free end of the lever 40 abuts against a collar 44 formed on a drive rod 42 which is axiallyslidably mounted to the support 100. One end of the rod 42 abuts against a first contact plate 46a which is fixedly secured to the support 100 in a cantilever fashion. A second contact plate 46b is arranged parallel to the contact plate 46a. Contact points 47a and 47b, which face each other, are formed on free ends of the contact plates 46a and 46b, respectively. The contact plate 46a is connected, via a wire 48a, to one side of the air conditioning control switch $SW_2$. The contact plate 46b is connected to the other side of the switch $SW_2$ via a wire 48b, a supplemental switch $SW_3$ and a wire 48b'. The supplemental switch $SW_3$ cooperates with the ignition switch $SW_1$ in such a manner that the switch $SW_3$ is closed when the ignition switch $SW_1$ is in its OFF position, and that the switch $SW_3$ is opened when the ignition switch $SW_1$ is in its ON position.

On the other end of the rod 42 opposite to the contact plate 46a, a diaphragm 50, which is located transverse to the rod 42, is fixedly attached. A chamber 52b formed on one side of the diaphragm 50 communicates with the atomosphere via an orifice 58 of a very small dimension, and via check valve comprised of a ball 54 rested on an air port 56 of a relatively large dimension. The check valve together with the orifice 58 forms a so-called dashpot mechanism which is operated to cause a slow return movement of the rod 42 when the lever 40 is turned in the counterclockwise direction of FIG. 1A.

The above-mentioned internal combustion engine operates as follows.

Figure 1B:
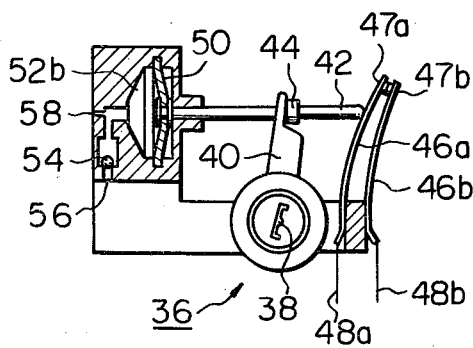
FIG. 1B is a partial view of FIG. 1A, showing the "ON" position of the mechanical delay switch.

When the ignition switch $SW_1$ is switched to its ON position by turning the ignition key 38 in a clockwise direction in order to start the rotation of the crankshaft 12 (FIG. 1A) of the engine, the drive 40 is also turned in the same direction as shown in FIG. 1B. This movement of the lever 40 causes the rod 42 to move in the right-hand direction of FIG. 1B because the lever 40 is being engaged with the collar 44. Therefore, a free end of the plate 46a abutting against the rod 42 is displaced toward the second contact plate 46b. As a result of this, the contact points 47a and 47b are contacted with each other. Since the supplemental switch $SW_3$ cooperating with the ignition switch $SW_1$ is now in its OFF position, due to the ON position of the ignition switch $SW_1$, the electric current from the battery B is not directed to the solenoid 32 (FIG. 1A) of the clutch 20 (FIG. 1A) via the contact points 47a and 47b. In order to operate the air conditioner, the air conditioning control switch $SW_2$ should be closed and switched to its ON position. When the switch $SW_2$ is closed, electric current from the battery B is allowed to be directed to the solenoid 32 (FIG. 1A). Thus, the solenoid 32 is energized, which causes the movable friction disk 22 (FIG. 1A) to become engaged with the other friction disk 24 (FIG. 1A). As a result of this, the rotational movement of the input shaft 26 (FIG. 1A), due to the rotation of the crankshaft 12 (FIG. 1A), can be transmitted to the output shaft 30 (FIG. 1A) which is connected to the compressor (not shown) of the air conditioner.

When the ignition key 38 is turned from the position shown in FIG. 1B to the position shown in FIG. 1A in order to turn off, the ignition switch $SW_1$ for stopping the engine, the drive lever 40 is simultaneously returned to the position shown in FIG. 1A, and the supplemental switch $SW_3$ cooperating with the ignition switch is closed. However, the rod 42 is slowly returned to the position in FIG. 1A by the spring force of the contact plate 46a, because a resistance force is applied to the diaphragm 50 due to the fact that air, which had previously been introduced into the chamber 52 via the large-dimensioned port 56 when the diaphragm 50 was in a position as shown by FIG. 1B, can now be discharged via the small-dimensioned orifice 58. As a result of this, the contact points 47a and 47b are maintained to be in contact with each other just after the ignition switch $SW_1$ is opened. Thus, electrical current from the battrery B is allowed to be directed to the solenoid 32 via the contact points 47a and 47b which are contacting with each other, and via the supplemental switch $SW_3$, which is now closed. This causes the friction disk 22 to be engaged with the disk 24. Therefore, the crankshaft 12, which continues to rotate due to the inertia, occurring just after the ignition key 38 has been turned off is mechanically connected to the compressor of the air conditioner. Thus, the internal rotation of the crankshaft 12 is effectively braked by the load of the compressor. This braking effect prevents the occurrence of the so-called "dieseling" phenomenon which is an unstable rotation of the engine occurring after the ignition switch $SW_1$ is opened due to the compression ignition of fuel issued from a slow fuel supply passageway (not shown) of the carburetor without forming a discharge arc between the electrodes of the spark plug.

After the lapsing of a predetermined short period of time, which is determined by the dimension of the orifice 58, and after the ignition key 38 has been turned to its OFF position, the drive rod 42 can be returned to the position shown in FIG. 1A. Thus, the contacts 47a and 47b are detached from each other, so that the electrical current from the battery B cannot be supplied to the solenoid 32 of the clutch 20, which prevents the battery B from being depleted.

Figure 2:
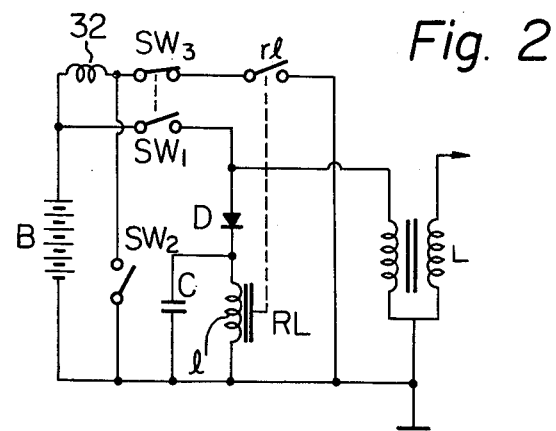
FIG. 2 is a modification of the embodiment shown in FIG. 1A, in which an electrical delay switch is used.

Shown in FIG. 2 is a modification of the embodiment of FIGS. 1A and 1B which comprises an electrical delay switch device adapted to energize the solenoid 32 for a predetermined short period of time after the ignition switch has been opened. This electrical delay switch device has a capacitor C, a diode D, and a relay unit RL. The relay unit RL has a solenoid l, which is connected in parallel to the capacitor C, and a switch element rl, which is normally opened. The diode D is connected to the ignition switch $SW_1$ so that an electrical current from the battery B is supplied to the capacitor C when the ignition switch $SW_1$ is closed. The switch element rl of the relay unit RL is connected to the supplemental switch $SW_3$, which is cooperating with the ignition switch $SW_1$, (as is already described with reference to FIG. 1A) in such a manner that an electrical current from the battery B can be applied to the solenoid 32 of the clutch 20 (which is described in FIG. 1A) when both the switch $SW_3$ and the switch element rl are closed.

The operation of this modification in FIG. 2 is as follows.

When the ignition switch $SW_1$ is closed to start the engine, the electrical current from the battery B is allowed to be directed to the capacitor C. Therefore, an amount of electrical charge is stored in the capacitor C. The electrical current from the battery B is also applied to the solenoid l of the realy unit RL, which causes the switch element rl to be closed. However, this does not cause the current from the battery B to be applied to the solenoid 32, because the supplemental switch $SW_3$, which is cooperating with the ignition switch $SW_1$, is now in its OFF position. In order to energize the solenoid 32 (in other words, to operate the air condition), the air conditioning control switch $SW_2$ must be closed.

When the ignition switch $SW_1$ is opened to stop the engine, the supplemental switch $SW_3$ is closed. The switch element rl of the relay unit RL is in its ON position just after the ignition switch $SW_1$ is opened, because the electrical current from the capacitor C, which stores an amount of electrical charge during the ON position of the ignition switch $SW_1$, can be directed to the solenoid l of the relay unit RL due to the presence of the diode D. As a result of the ON positions of the switch $SW_3$ and of the switch element rl, the electrical current from the battery B can be supplied to the solenoid 32 to engage the clutch 20 (FIG. 1A) of the air conditioner. Thus, immediately after the ignition switch $SW_1$ is opened, the inertia rotation of the crankshaft 12 (FIG. 1A) is braked by the load of the compressor of the air conditioner, thereby effectively preventing the occurrence of the "dieseling" phenomenon.

After the lapsing of a predetermined short period of time, which is determined by the capacity of the capacitance C, and after the $SW_1$ is opened, the electrical charge in the capacitance C is depleted, thereby opening the switch element rl to its OFF position. Thus, the supply of the electrical current to the solenoid 32 of the clutch 20 (FIG. 1A) is stopped to prevent the battery B from being depleted.

Figure 3:
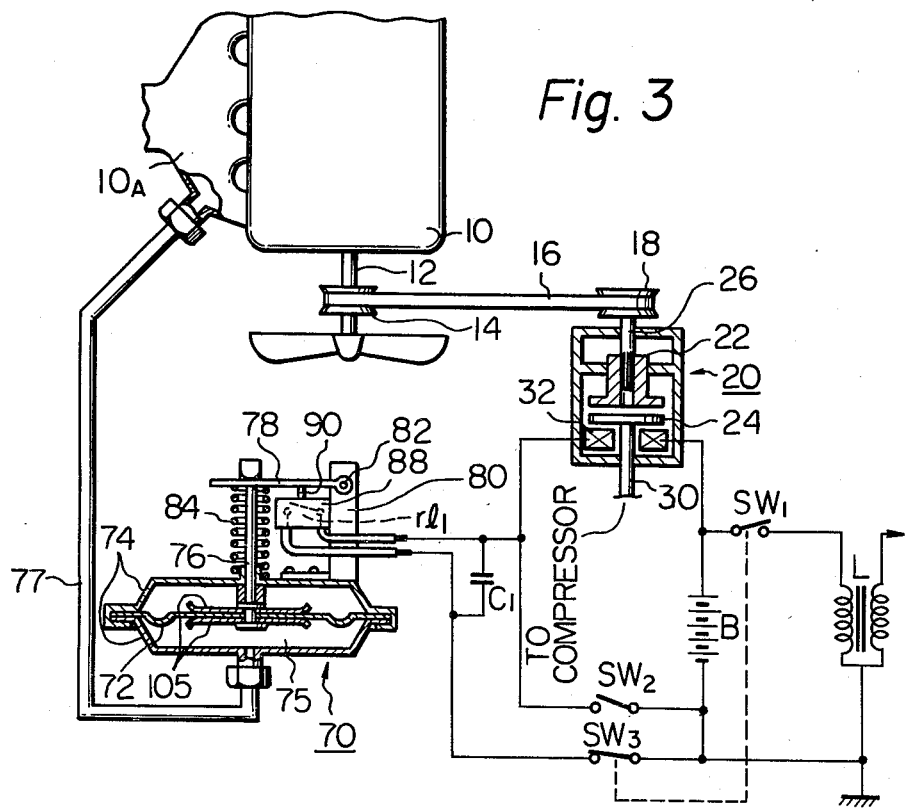
FIG. 3 is a schematic view showing a second embodiment of the present invention, in which a vacuum switch is used.

In FIG. 3 showing a second embodiment of the present invention, a vacuum switch device, which is adapted for operating the air conditioner until the vacuum level in the intake system of the engine is decreased to a predetermined value, is utilized in this second embodiment in order to prevent the occurrence of, "dieseling". This vacuum switch device has a vacuum switch 70 which is similar to the vacuum switch described in U.S. Pat. No. 3,251,352. The vacuum switch 70 has a vacuum actuator having a diaphragm 72 arranged across the interior of a case 74 for forming a vacuum chamber 75 on the lower side of the diaphragm 72. The chamber 75 communicates with an intake manifold 10A of the engine 10 via a vacuum pipe 77. A rod 76 is attached on one end thereof to the diaphragm 72 by means of a set of plates 105. The rod 76 is attached on the other end thereof to a lever 78 which is rotatably mounted to a vertical member 80 by a pin 82. A spring 84 rested on the case 74 urges the lever 78 upwardly together with the diaphragm 72.

A limit switch 88, which has an actuating member 90 and a switch element $rl_1$ operated by the member 90, is arranged opposite to the lever 78 so that the actuating member 90 can touch the lever 78. The limit switch 88 is connected to the solenoid 32 of the clutch 20 of the air conditioner in such a manner that an electrical current from the battery B is permitted to be directed to the solenoid 32, when the supplemental switch $SW_3$ which is cooperating with the ignition switch $SW_1$ (as is already described with reference to FIG. 1A) is closed and switched to its ON position. A capacitor $C_1$ is adapted for extinguishing an arc formed between the contacts of the switch element $rl_1$, when the element $rl_1$ is switched to its OFF position.

The embodiment described in FIG. 3 operates as follows. When the engine is operating, a vacuum force is applied to the diaphragm 72 of the vacuum switch 70, because the chamber 75 is opened, via the pipe 77, to the intake manifold 10A. Thus, the diaphragm 72 is displaced downwardly against the force of the spring 84, so that the lever 78 is pivoted about the pin 82 in a counterclockwise direction. This causes the actuating member 90 to be pushed downwardly, so that the switch member $rl_1$ of the limit switch 88 is closed and switched to its ON position. However, the ON position of the limit switch 88 does not cause the solenoid 32 of the clutch 20 to be energized because the supplemental switch $SW_3$ is in its OFF position when the engine is operating. In order to operate the air-conditioner, an air conditioning control switch $SW_2$ should be closed.

When the ignition switch $SW_1$ is opened to stop the engine, the engine continues to rotate due to the inertia therein, thereby maintaining the vacuum in the intake manifold 10A and keeping the vacuum switch 70 in its ON position. This causes the solenoid 32 to be energized and to become engaged with the clutch 20, because the supplemental switch $SW_3$ is now in its ON position. Therefore, the inertial rotation of the crankshaft 12 is transmitted to the compressor (not shown) of the air conditioner via the engaging clutch 20, thereby braking the rotation of the crankshaft 12 by the load of the compressor of the air-conditioner. When the vacuum level in the chamber 75 is decreased to a predetermined value which causes the rotation of the engine to be substantially stopped, the vacuum force applied to the diaphragm 72 becomes small enough to displace the diaphragm 72 upwardly by the force of the spring 84. Thus, the lever 78 is turned in a clockwise direction, so that the actuating member 90 of the limit switch 88 is upwardly displaced to open the switch element $rl_1$ for disengaging the clutch 20.

Figure 4A:
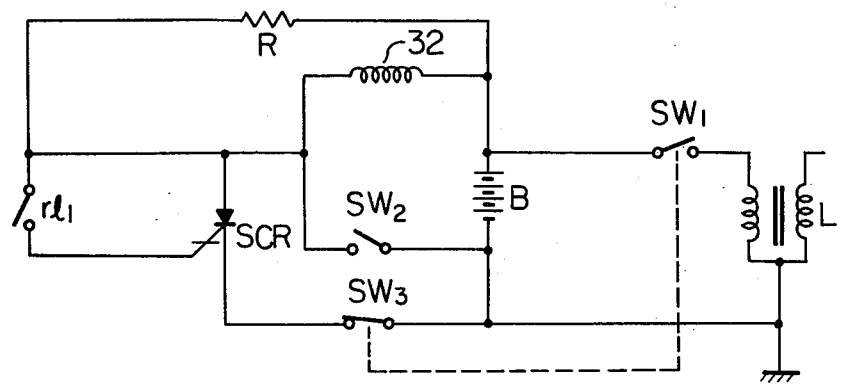
FIGS. 4A and 4B show modifications of the embodiment shown in FIG. 3.

In the embodiment shown in FIG. 3, a prolonged use of the limit switch 88 cannot be expected, because a relatively large current is passed through the switch element $rl_1$ when the solenoid 32 is energized. In a modified embodiment shown in FIG. 4A, a thyristor SCR is used instead of the switch element $rl_1$ of the limit switch 88 in FIG. 3 in order to overcome said drawback. The SCR operates to be closed when the switch element $rl_1$ and the supplemental switch $SW_3$ is closed. A very small amount of electrical current is allowed to pass through the switch element $rl_1$, because a resistor R of a relatively high resistance value is arranged between the switch element $rl_1$ and the battery B. This permits the prolonged use of the switch element $rl_1$.

Figure 4B:
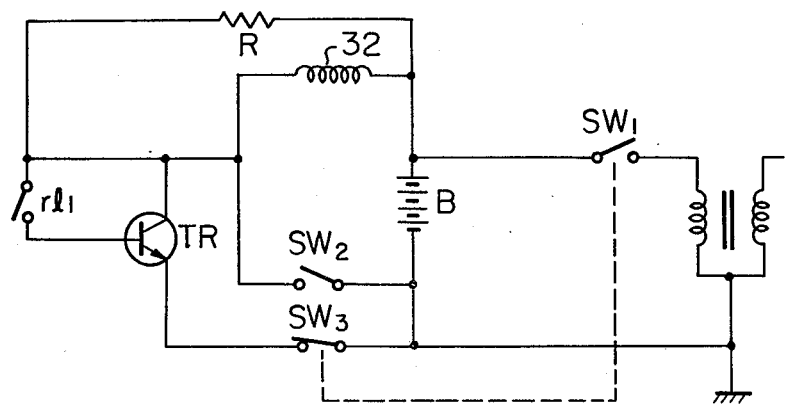

In another modification shown in FIG. 4B, a transistor TR is used instead of the thyristor SCR. The transistor TR operates to be closed when the switch element $rl_1$ and the switch $SW_3$ is closed. A very small amount of electrical current is permitted to pass through the switch element rl, due to the presence of the resistor R.

While this invention has been described above with reference to the drawings, many changes can be made thereto by those who are skilled in this art, without departing from the scope and spirit of the present invention.

What is claimed is:

1. In an internal combustion engine for an automobile provided with an ignition switch, an air conditioner having a compressor and an electro-magnetic clutch mechanism capable of mechanically connecting a crankshaft of said engine with said compressor when air conditioning is required during the operation of said engine in which the ignition switch of the engine is closed, the improvement comprising switch means to retard the "dieseling" phenomenon, said switch means being electrically connected to the clutch mechanism and cooperating with the ignition switch in such a manner that the switch means is open when the ignition switch is in its ON position, is closed when the ignition switch is switched to its OFF position for actuating the electro-magnetic clutch mechanism to engage it so that the rotation of the engine is braked due to the load of the compressor for preventing "dieseling" from occurring, and is opened after a short period of time has elapsed after the switching of the ignition switch to its OFF position for deactuating the clutch mechanism.

2. An internal combustion engine according to claim 1, wherein said switch means comprises: a first switch co-operating with the ignition switch in such a manner that the first switch is open when the ignition switch is in its ON position and is closed when the ignition switch is in its OFF position; and a second switch which is closed when the ignition switch is switched to its OFF position, and is open after a short period of time has elapsed from the switching of the ignition switch to its OFF position, said first and second switches being connected in series with each other for energizing the electromagnetic clutch mechanism when both the first and second switches are closed.

3. An internal combustion engine according to claim 2, wherein said second switch comprises: a first and a second spaced-apart contact plates, each having a contact point on a free end thereof; an axially movably supported drive rod, one end of which abuts against said first contact plate located near said rod; a drive lever cooperating with movement of an ignition key of said engine, said lever being capable of engaging with said drive rod to move said drive rod in one direction toward said first contact plate for displacing said free end of said first contact plate toward said second contact plate so that said contact points can be in contact with each other when said ignition key is turned to start said engine, said drive lever allowing free return movement of said drive rod in the other direction opposite to said one direction due to an elastic force of said first contact plate, when said ignition key is turned to stop said engine; and a dashpot mechanism for restricting the speed of said return movement of said drive rod so that said contact points are kept in contact with each other for a predetermined period of time after said ignition key is turned to its OFF position to stop said engine.

4. An internal combustion engine according to claim 1, wherein said switch means comprises:
 a first switch cooperating with the ignition switch in such a manner that the first switch is open when the ignition switch is in its ON position and is closed when the ignition switch is in its OFF position;
 a capacitor connected to a battery of the engine via the ignition switch to store a predetermined amount of electrical charge during operation of the engine; and
 a relay unit connected in parallel to said capacitor, said relay unit having a second switch for connecting the electro-magnetic clutch mechanism with the battery via the first switch for causing the electric charge of the capacitor to hold the second switch of the relay unit in a closed position, thereby engaging the clutch mechanism for a predetermined short period of time after the ignition switch is opened to stop the engine.

5. An internal combustion engine according to claim 1, wherein said switch means comprises a vacuum-operated switch means adapted for energizing said electromagnetic clutch mechanism until the vacuum level in the intake system of the engine is decreased to a predetermined small value.

* * * * *